United States Patent [19]

Matsumoto

[11] Patent Number: 5,579,291
[45] Date of Patent: Nov. 26, 1996

[54] COMPACT-SIZE MAGNETO-OPTICAL HEAD APPARATUS

[75] Inventor: Yoshiyuki Matsumoto, Tokyo, Japan

[73] Assignee: Sony Corporation, Tokyo, Japan

[21] Appl. No.: 358,024

[22] Filed: Dec. 16, 1994

[30] Foreign Application Priority Data

Dec. 24, 1993 [JP] Japan .................................... 5-347361

[51] Int. Cl.$^6$ .............................. G11B 11/00; G11B 7/00
[52] U.S. Cl. ............................ 369/13; 369/110; 369/112; 369/44.23
[58] Field of Search .......................... 369/13, 110, 44.11, 369/44.14, 44.23, 44.26, 44.38, 112, 107, 116, 114, 44.24, 44.37, 109; 360/114, 59

[56] References Cited

U.S. PATENT DOCUMENTS

| | | |
|---|---|---|
| 4,730,297 | 3/1988 | Ishibashi et al. ........................ 369/110 |
| 5,293,364 | 3/1994 | Shimonou ............................. 369/44.25 |
| 5,404,490 | 4/1995 | Matsubayashi et al. ............ 369/110 X |

*Primary Examiner*—Ali Neyzari
*Attorney, Agent, or Firm*—Limbach & Limbach LLP

[57] ABSTRACT

A magneto-optical head apparatus of a recording and/or reproducing apparatus includes a light beam generating unit, an objective lens, a separating optical element, a reflecting mirror, and a photodetector. The objective lens converges a light beam emitted from the light beam generating unit on a point on an optical axis, e.g., a point on the recording layer of a magneto-optical recording medium. The separating optical element deflects the light beam emitted from the light beam generating unit, and separates the light beam emitted from the light beam generating unit and a light beam through the objective lens. The reflecting mirror deflects the light beam emitted from the light beam generating unit and deflected by the separating optical element at 90° so that the light beam is led to the objective lens. The photodetector receives the light beam irradiating through the objective lens and passing through the separating optical element. The light beam generating unit, the objective lens, the separating optical element and the photodetector are disposed so that the optical axis of the light beam emitted from the light beam generating unit, the optical axis extending from the separating optical element to the reflecting mirror, the optical axis from the reflecting mirror to the objective lens, and the optical axis from the separating optical element to the photodetector define the same plane.

10 Claims, 7 Drawing Sheets

COMPACT-SIZE MAGNETO-OPTICAL HEAD APPARATUS

BACKGROUND

1. Field of the Invention

The present invention relates to a magneto-optical head apparatus. More particularly, the present invention relates to a magneto-optical head apparatus for use in a magneto-optical recording and/or reproducing apparatus which is suitable for achieving reduction in size.

2. Background of the Invention

Figure 1:
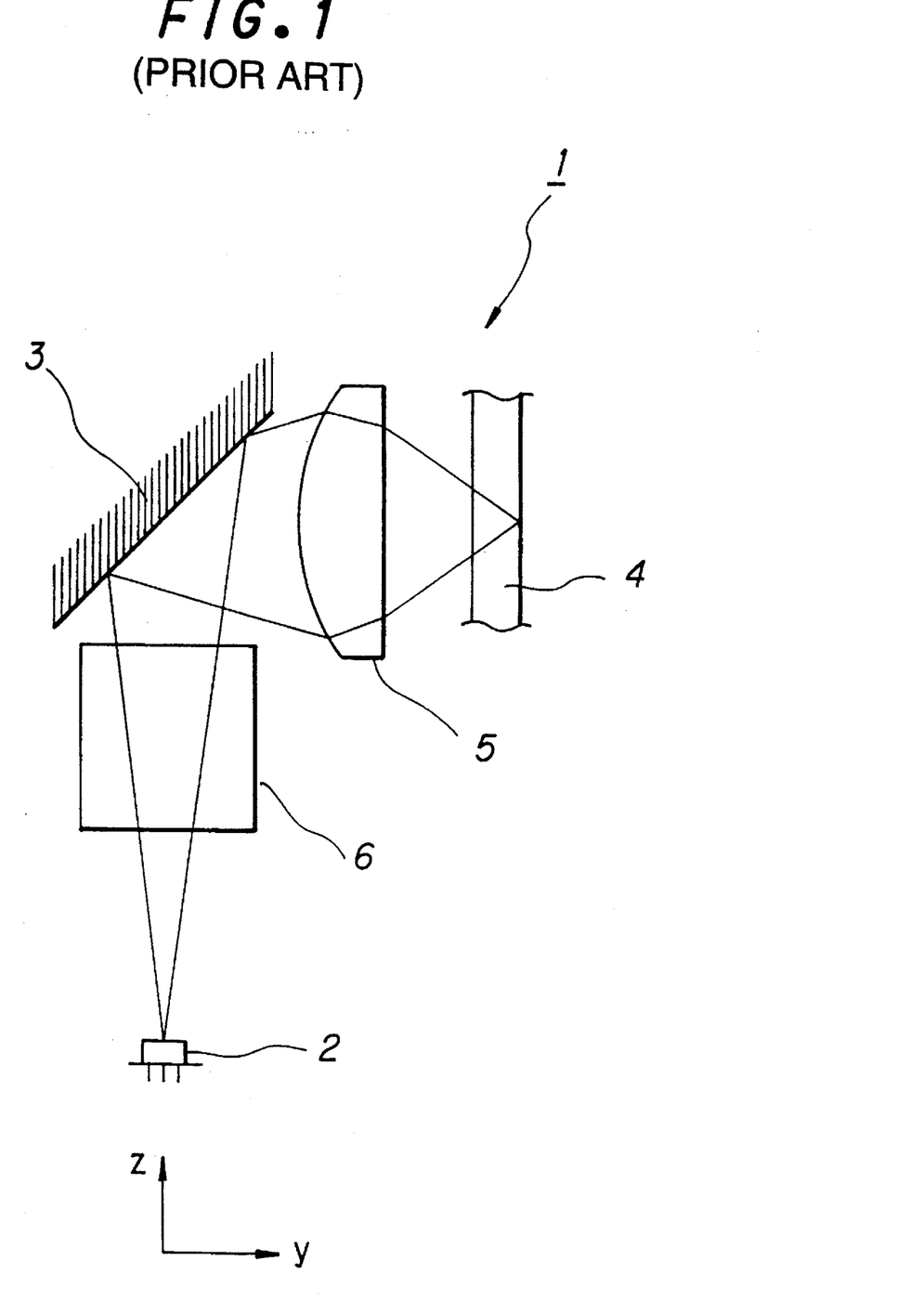
FIG. 1 schematically shows the arrangement of one example of an optical head apparatus.

An optical head apparatus is used to record or reproduce an information signal onto or from an optical recording medium, e.g., a magneto-optical recording medium. A typical optical head apparatus is arranged as shown in FIG. 1. It should be noted that in the following description the optical head apparatus will be explained by way of one example in which a disc-shaped optical recording medium (hereinafter referred to simply as "optical disc") is used as an optical recording medium.

Figure 2:
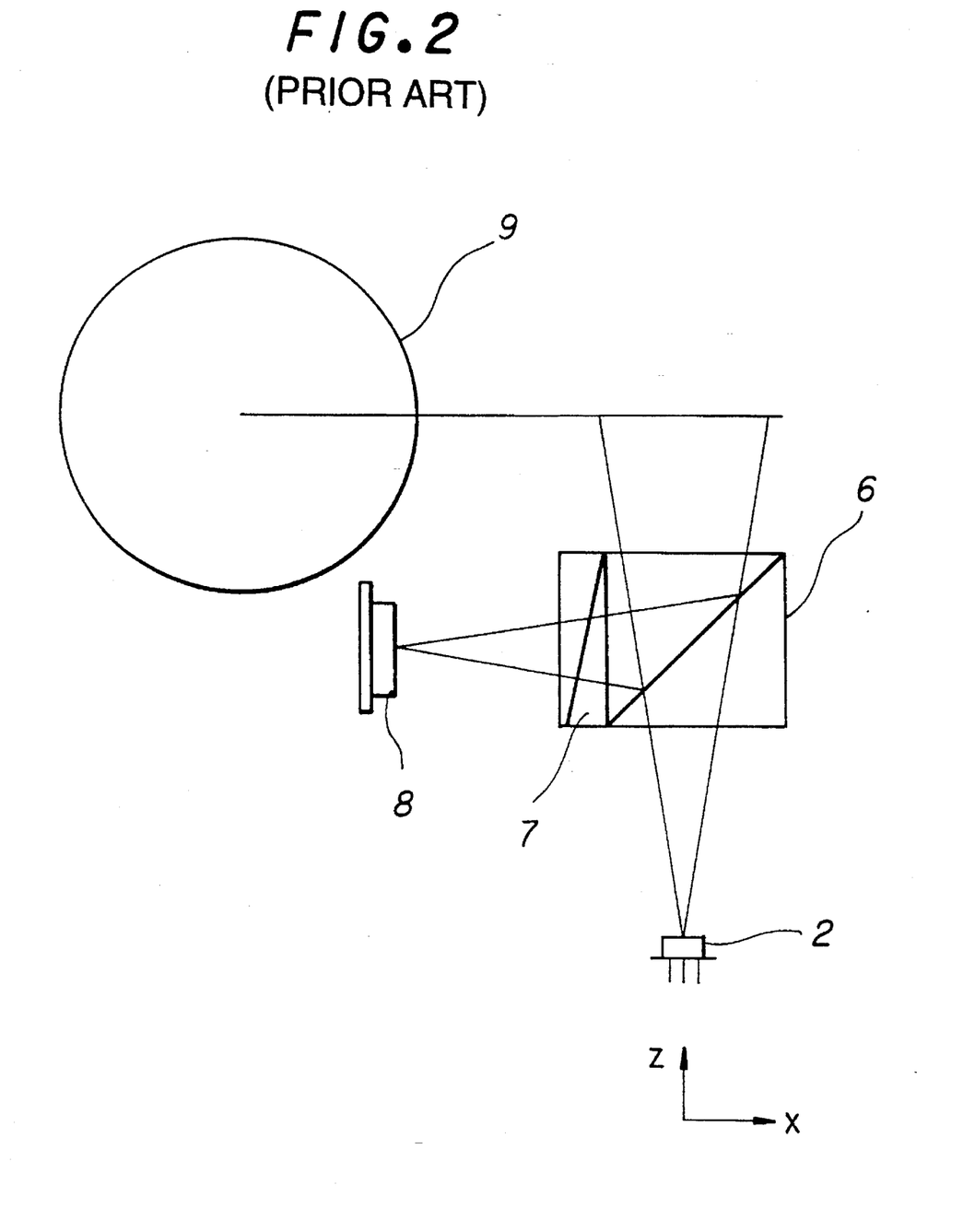
FIG. 2 is a plan view schematically showing the arrangement of the optical head apparatus shown in FIG. 1.

Referring to FIGS. 1 and 2, the optical head apparatus 1 has a semiconductor laser 2 as a light source, a reflecting mirror 3, an objective lens 5, a beam splitter 6, a Wollaston prism 7, and a photodetector 8. The optical head apparatus 1 is, although not shown, provided with an actuator for driving the objective lens 5 in both focusing and tracking directions. The semiconductor laser 2 outputs a light beam on the basis of a drive signal from a driver circuit (not shown) such that, when an information signal is to be recorded onto an optical disc 4, the semiconductor laser 2 outputs a light beam of high output level, whereas, when an information signal is to be read out from the optical disc 4, the semiconductor laser 2 radiates a light beam of low output level. The reflecting mirror 3 may be a totally reflecting mirror or other reflecting mirror. The reflecting mirror 3 is disposed on the optical axis of the objective lens 5 at a tilt angle of 45° with respect to the Z-axis direction in FIG. 1, that is, the optical axis of the light beam emitted from the semiconductor laser 2. The objective lens 5 converges the light beam reflected by the reflecting mirror 3 on the recording surface of the optical disc 4. The objective lens 5 is an aspherical lens made of a material transparent to a light beam. The beam splitter 6 separates the light beam emitted from the semiconductor laser 2 and a light beam through the objective lens 5 from each other, and deflects the optical path of the light beam passing through the objective lens 5 at 90°. The beam splitter 6 is, for example, a polarization beam splitter. The Wollaston prism 7 generates a plurality of light beams from the light beam separated by the beam splitter 6. The Wollaston prism 7 is formed by bonding together two prisms made of an optical material having optical anisotropy, as disclosed, for example, in U.S. Pat. No. 4,771,414. The Wollaston prism 7 is attached to one output surface of the beam splitter 6, that is, one side surface of the beam splitter 6, as shown in FIG. 2. The photodetector 8 has a plurality of light receiving portions for receiving the light beams, respectively, which are generated by the Wollaston prism 7. The photodetector 8 is disposed at a position where the light beams outputting from the Wollaston prism 7 are focused.

It should be noted that the optical disc 4 is rotationally driven at a constant linear velocity or a constant angular velocity by a spindle motor 9.

In the optical head apparatus 1 arranged as described above, the light beam emitted from the semiconductor laser 2 passes through the beam splitter 6 and impinges on the reflecting mirror 3 where the optical path of the light beam is deflected at 90° so that the light beam is led to the objective lens 5. The objective lens 5 converges the light beam emitted from the semiconductor laser 2 on the recording surface of the optical disc 4. The light beam reflected by the recording surface of the optical disc 4 is led into the optical head apparatus 1 through the objective lens 5. The light beam irradiating the optical head apparatus 1 through the objective lens 5 is separated from the light beam emitted from the semiconductor laser 2 by the beam splitter 6, while the optical path thereof is deflected at 90° by the beam splitter 6, and thus the light beam outputs from the Wollaston prism 7 in the form of a plurality of light beams, which are received by the respective light receiving portions of the photodetector 8. On the basis of an output signal from the photodetector 8, a reproduced signal of the information signal recorded on the optical disc 4 is generated, together with various error signals based on a focusing error, a tracking error, etc. A servo signal for driving the above-described actuator is generated according to the focusing error signal and the tracking error signal.

In the optical head apparatus 1, as shown in FIG. 2, the optical path, or the optical axis, which extends from the semiconductor laser 2 to the reflecting mirror 3 via the beam splitter 6, and the optical path, or the optical axis of the light beam, which extends from the reflecting mirror 3 to the photodetector 8 via the beam splitter 6 are parallel to the recording surface of the optical disc 4. In other words, the semiconductor laser 2, the beam splitter 6, the Wollaston prism 7 and the photodetector 8 are disposed in a plane parallel to the recording surface of the optical disc 4. In contrast, the optical path, or the optical axis, which extends from the reflecting mirror 3 to the objective lens 5 is perpendicular to the recording surface of the optical disc 4.

The optical head apparatus 1 is fed from the inner periphery toward the outer periphery or vice versa of the optical disc 4, that is, in the X-axis direction in FIG. 2, by a feed mechanism (not shown). During the feed of the optical head apparatus 1, the spot of light beam converged on the recording surface of the optical disc 4 by the objective lens 5 moves on one straight line passing through the center of tracks on the recording surface of the optical disc 4, which is driven to rotate by the spindle motor 9, as shown in FIG. 2.

In the optical head apparatus 1 arranged as described above, since the semiconductor laser 2, the beam splitter 6, the Wollaston prism 7 and the photodetector 8 are disposed in a plane parallel to the recording surface of the optical disc 4, when the optical head apparatus 1 is fed toward the inner periphery of the optical disc 4, particularly when it is fed to the innermost peripheral region, the optical head apparatus 1 and the spindle motor 9 are likely to interfere with each other. That is, since the photodetector 8 is disposed at a position in the optical head apparatus 1 that is closer to the spindle motor 9, as shown in FIG. 2, when the optical head apparatus 1 is fed to the innermost peripheral region of the optical disc 4, a portion of the optical head apparatus 1 where the photodetector 8 is provided is likely to collide with the spindle motor 9.

One approach to solve the above problem is to dispose the photodetector 8 at the opposite side as viewed in FIG. 2, that is, at a position symmetric with the illustrated position with respect to the optical axis of the light beam emitted from the semiconductor laser 2. In this case, however, when the optical head apparatus 1 is fed to the outermost peripheral region of the optical disc 4, it projects outward from the outer peripheral edge of the optical disc 4, resulting in an increase in the overall size of a recording and/or reproducing apparatus that uses the optical head apparatus 1.

Further, in the optical head apparatus 1 as shown in FIGS. 1 and 2, the light beam reflected by the optical disc 4 is separated and deflected by the beam splitter 6 before being applied to the photodetector 8 through the Wollaston prism 7. Accordingly, the optical path length from the beam splitter 6 to the photodetector 8 becomes relatively long, resulting in an increase in the overall size of the optical head apparatus 1. Further, since the number of constituent elements of the optical head apparatus 1 is large, a large number of steps are required for assembly and adjustment, which leads to a rise in cost.

SUMMARY OF THE INVENTION

It is, therefore, an object of the present invention to provide a magneto-optical head apparatus which resolves the above-mentioned problems.

According to the present invention, there is provided a magneto-optical head apparatus including a light beam generating unit, an objective lens, a separating optical element, a reflecting mirror, and a photodetector. The light beam generating unit emits a light beam. The objective lens converges the light beam emitted from the light beam generating unit on a point on an optical axis. The separating optical element separates the light beam emitted from the light beam generating unit and a light beam through the objective lens from each other. The reflecting mirror deflects the light beam emitted from the light beam generating unit at 90° so that the light beam is led to the objective lens. The photodetector receives the light beam through the objective lens and separated by the separating optical element. The light beam generating unit, the objective lens, the separating optical element and the photodetector are disposed so that an optical axis of the light beam emitted from the light beam generating unit, an optical axis extending from the separating optical element to the reflecting mirror, an optical axis extending from the reflecting mirror to the objective lens, and an optical axis extending from the separating optical element to the photodetector define the same plane.

According to the present invention, there is provided a magneto-optical head apparatus including a light beam generating unit, an objective lens, a separating optical element, a reflecting mirror, and a photodetector. The light beam generating unit emits a light beam. The objective lens converges the light beam emitted from the light beam generating unit on a point on an optical axis. The separating optical element deflects the light beam emitted from the light beam generating unit and for separates the light beam emitted from the light beam generating unit and a light beam outputting through the objective lens from each other. The reflecting mirror deflects the light beam emitted from the light beam generating unit and deflected by the separating optical element at 90° so that the light beam is led to the objective lens. The photodetector receives the light beam through the objective lens and passing through the separating optical element. The light beam generating unit, the objective lens, the separating optical element and the photodetector are disposed so that an optical axis of the light beam emitted from the light beam generating unit, an optical axis extending from the separating optical element to the reflecting mirror, an optical axis extending from the reflecting mirror to the objective lens, and an optical axis extending from the separating optical element to the photodetector define the same plane.

According to the present invention, there is provided a magneto-optical head apparatus including a light beam generating unit, an objective lens, a separating optical element, a reflecting mirror, and a second photodetector. The light beam generating unit has a light source for emitting a light beam, and a first photodetector for detecting errors. The objective lens converges the light beam emitted from the light beam generating unit on a point on an optical axis. The separating optical element separates the light beam emitted from the light beam generating unit and a light beam through the objective lens from each other. The reflecting mirror deflects the light beam emitted from the light beam generating unit at 90° so that the light beam is led to the objective lens. The second photodetector receives the light beam through the objective lens to detect a reproduced signal. The light beam through the objective lens is split by the separating optical element into a light beam that is led to the first photodetector, and another light beam that is led to the second photodetector, and wherein the light beam generating unit, the objective lens, the separating optical element and the second photodetector are disposed so that an optical axis of the light beam emitted from the light beam generating unit, an optical axis extending from the separating optical element to the reflecting mirror, an optical axis extending from the reflecting mirror to the objective lens, and an optical axis extending from the separating optical element to the second photodetector define the same plane.

According to the magneto-optical head apparatus of the present invention, the overall size of the apparatus can be reduced, and thus the apparatus can be formed in a compact structure. In addition, since the size of the apparatus in the direction of a plane perpendicular to the optical axis of the objective lens can be reduced, there is no possibility of the magneto-optical head apparatus interfering with other mechanism when it is fed by a feed mechanism.

DESCRIPTION OF THE INVENTION

The magneto-optical head apparatus according to the present invention will be described below in detail with reference to the accompanying drawings.

It should be noted that the magneto-optical head apparatus in each of the following embodiments will be explained by way of one example in which it is used in a recording and/or reproducing apparatus.

First, a magneto-optical head apparatus according to a first embodiment of the present invention will be explained in detail with reference to FIGS. 3 to 5.

Figure 3:
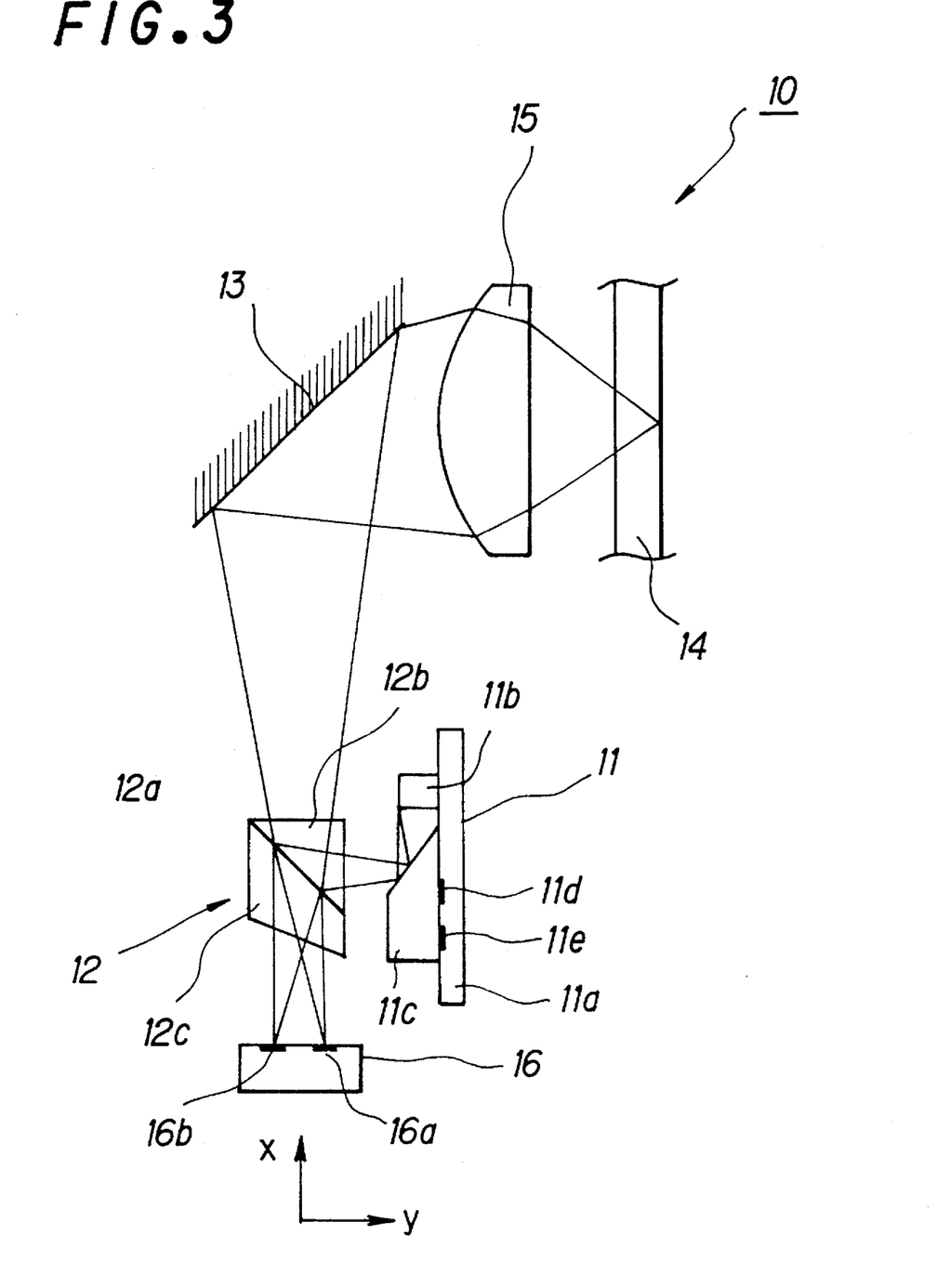
FIG. 3 shows the arrangement of a magneto-optical head apparatus according to a first embodiment of the present invention.
Figure 4:
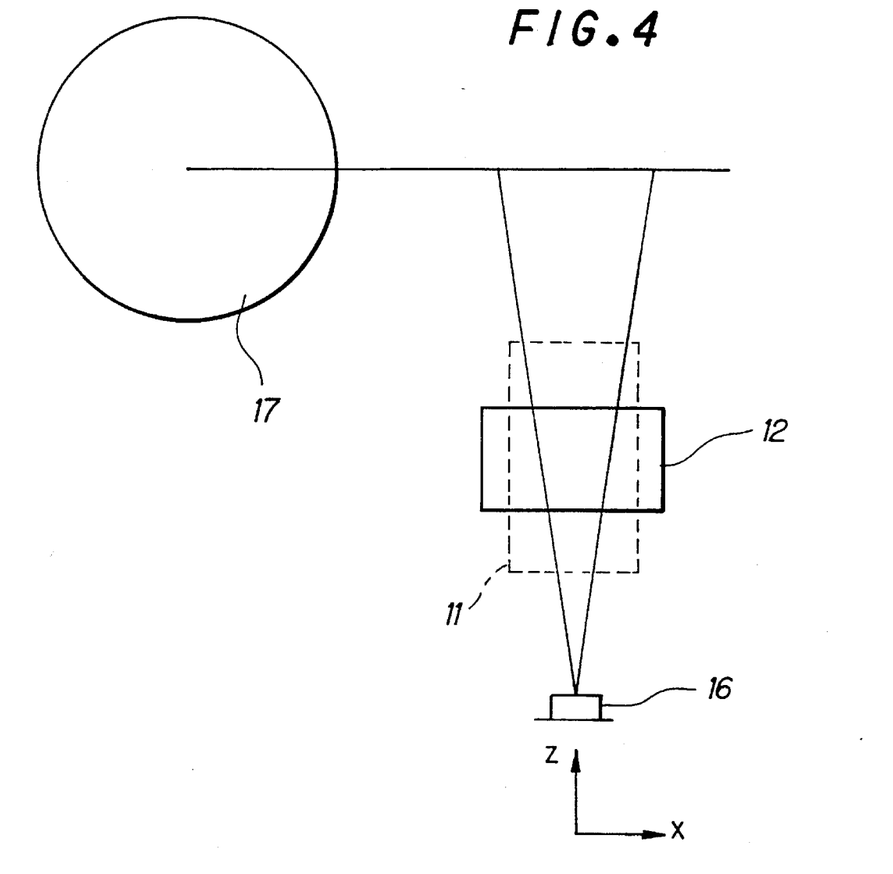
FIG. 4 is a plan view showing the arrangement of the magneto-optical head apparatus according to the first embodiment.

Referring to FIGS. 3 and 4, a magneto-optical head apparatus 10 has a light beam generating and detecting unit 11, a beam splitter 12, a totally reflecting mirror 13, an objective lens 15, and a photodetector 16.

The light beam generating and detecting unit 11 has a substrate 11a, a semiconductor laser 11b, an optical prism 11c, and a pair of photodetectors 11d and 11e. The substrate 11a is formed by using a material, e.g., silicon (Si). The photodetectors 11d and 11e are formed on the substrate 11a by a semiconductor process. The photodetectors 11d and 11e are each have three strip-shaped light-receiving portions which are parallel to each other. Arithmetic processing is executed by using output signals from the photodetectors 11d and 11e, thereby generating error signals, e.g., a focusing error signal, a tracking error signal, etc., and address and other signals previously recorded on a magneto-optical disc 14. The semiconductor laser 11b is mounted on the substrate 11a.

The optical prism 11c has a quadrangular-shaped configuration in which a side surface opposite to the semiconductor laser 11b inclines at a predetermined angle. The inclined surface is coated with a dielectric multilayer layer. The dielectric multilayer layer reflects a light beam emitted from the semiconductor laser 11b but transmits a light beam reflected by the beam splitter 12 and thus allows it to irradiate the optical prism 11c. The optical prism 11c is rigidly secured to the surface of the substrate 11a by an adhesive or the like in such a manner that the optical prism 11c covers the photodetectors 11d and 11e formed on the substrate 11a. The light beam reflected by the beam splitter 12 irradiates the optical prism 11c through the inclined surface thereof. The light beam repeats reflection in the optical prism 11c and is eventually received by the photodetectors 11d and 11e. The light beam generating and detecting unit 11 is disposed in the upper part of the magneto-optical head apparatus 10, that is, at a position closer to the magneto-optical disc 14.

Figure 5:
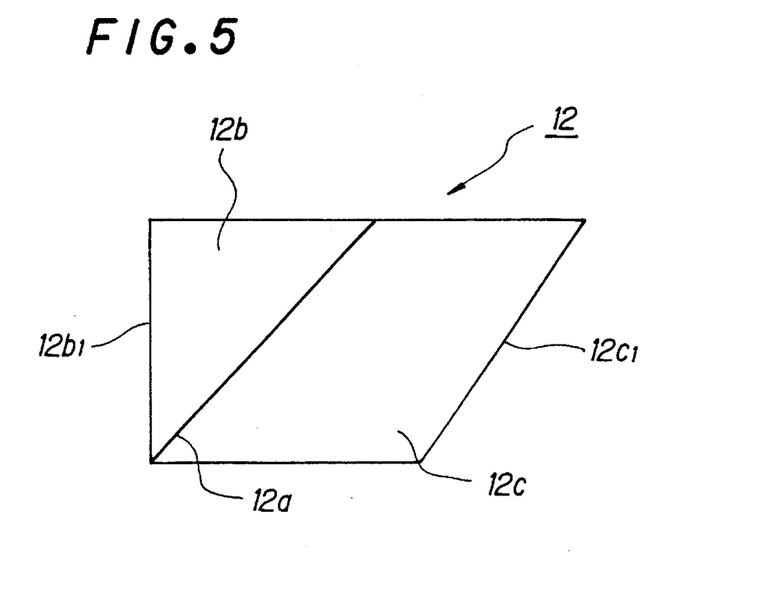
FIG. 5 shows the arrangement of a beam splitter used in the present invention.

As shown in FIG. 5, the beam splitter 12 is composed of a first optical prism 12b, a second optical prism 12c, and a dielectric multilayer layer 12a which is provided between the first and second optical prisms 12b an 12c. The first optical prism 12b is formed in a triangular-shaped configuration by using an optical material having no optical anisotropy. The second optical prism 12c is formed in a quadrangular-shaped configuration by using an optical material having optical anisotropy (birefringence properties). The second optical prism 12c generates two light beams having a predetermined angle of divergence, that is, an ordinary ray and an extraordinary ray, from a light beam passing through the second optical prism 12c among light beams incident on the beam splitter 12 through the objective lens 15. The first optical prism 12b and the second optical prism 12c are cemented together in a hexahedral form with the dielectric multilayer layer 12a interposed therebetween so that the first optical prism 12b lies at a side from which the light beam emitted from the semiconductor laser 11b is outputted, while the second optical prism 12c lies at a side from which the light beam passing through the objective lens 15 is outputted.

In the first embodiment, assuming that the light beam emitted from the semiconductor laser 11b as a light source has a wavelength $\lambda$ of 780 nm, for example, the first optical prism 12b is made of using SF03 (trade name: manufactured by OHARA Inc.), which has a refractive index of 1.825, while the second optical prism 12c is made of lithium niobate ($LiNbO_3$), whose refractive index for the ordinary ray is 2.258 and whose refractive index for the extraordinary ray is 2.178. When the second optical prism 12c is made of $LiNbO_3$, since $LiNbO_3$ has a relatively large refractive index, the light beam emerging from the beam splitter 12 toward the photodetector 16 is undesirably bent away from the optical axis extending from the reflecting mirror 13 to the photodetector 16, and the output light beam undesirably involves astigmatism. In addition, two light beams interfere with each other on two light receiving portions of the photodetector 16, as described later. To solve these problems, as shown in FIG. 5, the output surface of the second optical prism 12c from which the light beam passing through the objective lens 15 outputs is inclined as a inclined surface $12c_1$ so as to be non-parallel to the output surface $12b_1$ of the first optical prism 12b. As a result, the two light beams outputting from the second optical prism 12c lie on the upper and lower sides, respectively, of the optical axis extending from the reflecting mirror 13 to the photodetector 16 as viewed in FIG. 3. In FIG. 3, the upper light beam is an ordinary ray, and the lower light beam is an extraordinary ray.

The dielectric multilayer layer 12a is provided between a inclined surface of the first optical prism 12b and a inclined surface of the second optical prism 12c. The dielectric multilayer layer 12a deflects the optical path of the light beam emitted from the light beam generating and detecting unit 11 at 90°. Further, the dielectric multilayer layer 12a reflects a part of the light beam passing through the objective lens 15 at 90° and transmits it so that the reflected light beam is led to the photodetectors 11d and 11e of the light beam generating and detecting unit 11. Moreover, the dielectric multilayer layer 12a transmits another part of the light beam passing through the objective lens 15 so that the transmitted light beam is led to the photodetector 16. The dielectric multilayer layer 12a is formed on the inclined surface of either of the first and second optical prisms 12b and 12c by coating or other similar process, and thereafter, the inclined surface of the first optical prism 12b and the inclined surface of the second optical prism 12c are bonded together, with the crystal optical axis of the second optical prism 12c tilted at 45° in a plane perpendicular to the optical axis extending from the reflecting mirror 13 to the photodetector 16, thereby forming a beam splitter 12 such as that shown in FIG. 5.

The totally reflecting mirror 13 is disposed below the objective lens 15 and on the optical axis of the objective lens 15 at a tilt angle of 45° with respect to the optical axis of the light beam emitted from the semiconductor laser 11b and deflected by the beam splitter 12.

The objective lens 15 is an aspherical lens made of glass or a synthetic resin material transparent to a light beam. The objective lens 15 converges the light beam reflected by the reflecting mirror 13 on the recording surface of the magneto-optical disc 14. The objective lens 15 is moved in a direction parallel to the optical axis of the objective lens 15, i.e., in the focusing direction, and also in the direction of plane perpendicular to the optical axis of the objective lens 15, i.e., in the tracking direction, by an actuator (not shown) of the magneto-optical head apparatus 10. The objective lens 15 is moved in the focusing and tracking directions by the actuator so as to cancel focusing and tracking errors when an information signal is to be recorded onto the magneto-optical disc 14 or an information signal recorded on the magneto-optical disc 14 is to be read out.

The photodetector 16 has a first light receiving portion 16a and a second light receiving portion 16b, which respectively receive two light beams having a predetermined angle of divergence, which are generated by the second optical prism 12c, i.e., ordinary and extraordinary rays. By determining a difference between output signals from the first and second light receiving portions 16a and 16b, a reproduced signal of the information signal recorded on the magneto-optical disc 14 is obtained.

The magneto-optical head apparatus 10 is fed from the outer periphery of the magneto-optical disc 14 toward the inner periphery thereof and vice versa and also in the direction normal to the plane of FIG. 3 by a feed mechanism (not shown). It should be noted that the magneto-optical disc 14 is rotationally driven at a constant linear velocity or a constant angular velocity by a spindle motor 17 shown in FIG. 4.

In the magneto-optical head apparatus 10, arranged as described above, the light beam emitted from the light beam generating and detecting unit 11 is reflected by the inclined surface of the optical prism 11c and thus led to the beam splitter 12. The light beam incident on the beam splitter 12 is reflected by the dielectric multilayer layer 12a so that the optical path of the incident light beam is deflected at 90°. Thus, the light beam emanates from the beam splitter 12 toward the reflecting mirror 13. The light beam from the beam splitter 12 is reflected by the reflecting mirror 13 so that the optical path thereof is deflected at 90° again. Thus, the light beam is converged on the recording surface of the magneto-optical disc 14 by the objective lens 15. At this time, the objective lens 15 is moved in both the focusing and tracking directions by the actuator so as to cancel focusing and tracking errors. The light beam irradiated to the recording surface of the magneto-optical disc 14 is reflected by the recording surface of the magneto-optical disc 14 so that the reflected light beam leads into the magneto-optical head apparatus 10 through the objective lens 15. The light beam passing through the objective lens 15, that is, the reflected light beam, irradiates the beam splitter 12 where a part of the reflected light beam is led to the light beam generating and detecting unit 11 with the optical path thereof deflected at 90°, while the remaining reflected light beam passes through the beam splitter 12. When the remaining reflected light beam passes through the second optical prism 12c, two light beams, i.e., ordinary and extraordinary rays, are generated. The two light beams generated by the beam splitter 12 are received by the light receiving portions 16a and 16b, respectively, of the photodetector 16. Meanwhile, the reflected light beam deflected toward the light beam generating and detecting unit 11 passes through the inclined surface of the optical prism 11c of the light beam generating and detecting unit 11 and is received by the photodetectors 11d and 11e. Consequently, by executing arithmetic processing using output signals from the photodetectors 11d and 11e, error signals, e.g., a focusing error signal, a tracking error signal, etc., are generated, together with address and other signals recorded on the magneto-optical disc 14. By determining a difference between output signals from the light receiving portions 16a and 16b of the photodetector 16, a reproduced signal of the information signal recorded on the magneto-optical disc 14 can be obtained.

As shown in FIG. 3, in the magneto-optical head apparatus 10 according to the first embodiment, the light beam generating and detecting unit 11, the beam splitter 12, the reflecting mirror 13 and the photodetector 16 are all disposed in a plane perpendicular to the recording surface of the magneto-optical disc 14, i.e., the XY-plane, in FIG. 3. In other words, the above-described constituent elements are disposed in a single plane containing the optical axis extending from the reflecting mirror 13 to the photodetector 16 via the beam splitter 12, the optical axis extending from the light beam generating and detecting unit 11 to the beam splitter 12, and the optical axis extending from the reflecting mirror 13 to the objective lens 15. Consequently, in the magneto-optical head apparatus 10 according to the first embodiment, the width in the ZX-plane in FIG. 4 can be reduced. Accordingly, it is possible to avoid collision of the magneto-optical head apparatus 10 with the spindle motor 17 which might otherwise occur when the magneto-optical head apparatus 10 is fed toward the inner periphery of the magneto-optical disc 14 by the feed mechanism. Further, when the magneto-optical head apparatus 10 is fed toward the outer periphery of the magneto-optical disc 14, the extent to which it projects from the outer peripheral edge of the magneto-optical disc 14 is minimized. Accordingly, it is possible to avoid an increase in the overall size of the recording and/or reproducing apparatus.

Figure 6:
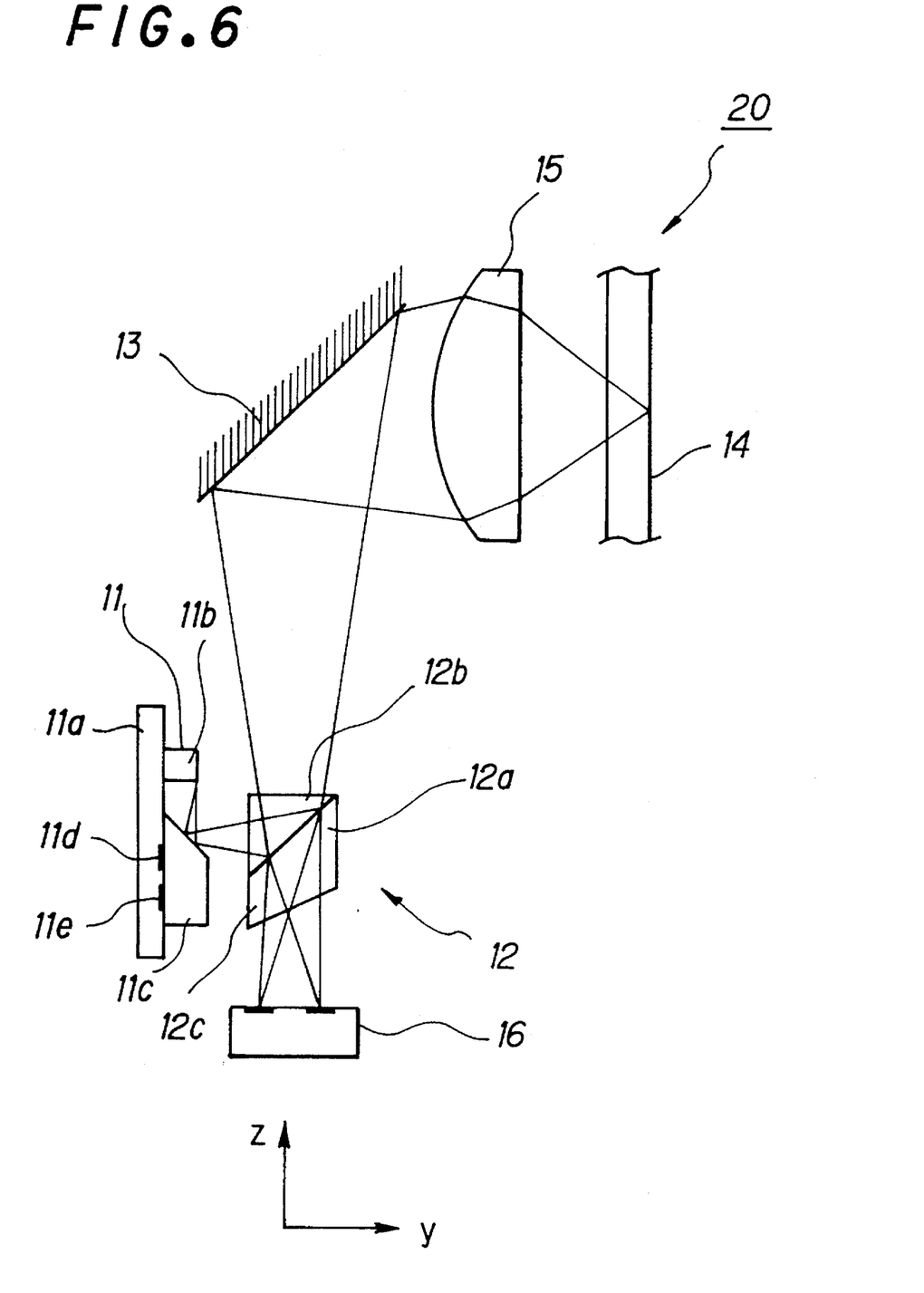
FIG. 6 shows the arrangement of a magneto-optical head apparatus according to a second embodiment of the present invention.

Next, a magneto-optical head apparatus 20 according to a second embodiment of the present invention will be explained with reference to FIG. 6. It should be noted that in FIG. 6 members or portions which are common to the first and second embodiments are denoted by the same reference numerals as those in the first embodiment, and repeated description thereof is omitted. The second embodiment differs from the first embodiment only in the position of the light beam generating and detecting unit in the magneto-optical head apparatus. For the rest of the arrangement, the second embodiment is arranged in the same way as in the first embodiment.

In the first embodiment, the light beam generating and detecting unit 11 is disposed at a position in the magneto-optical head apparatus 10 which is closer to the magneto-optical disc 14. In contrast, in the second embodiment, the light beam generating and detecting unit 11 is disposed at the lower side as viewed in FIG. 6, that is, at a position on the side of the magneto-optical head apparatus 20 which is reverse to the side thereof that faces the magneto-optical disc 14. By disposing the light beam generating and detecting unit 11 at such a position, the distance between the magneto-optical disc 14 and the side of the magneto-optical head apparatus 20 that opposes the magneto-optical disc 14 can be increased. Thus, it is possible to avoid collision of the magneto-optical disc 14 with the magneto-optical head apparatus 20 even if the magneto-optical disc 14 undulates up and down owing to warpage thereof or other cause.

Subsequently, a magneto-optical head apparatus according to a third embodiment of the present invention will be explained in detail with reference to FIG. 7.

Figure 7:
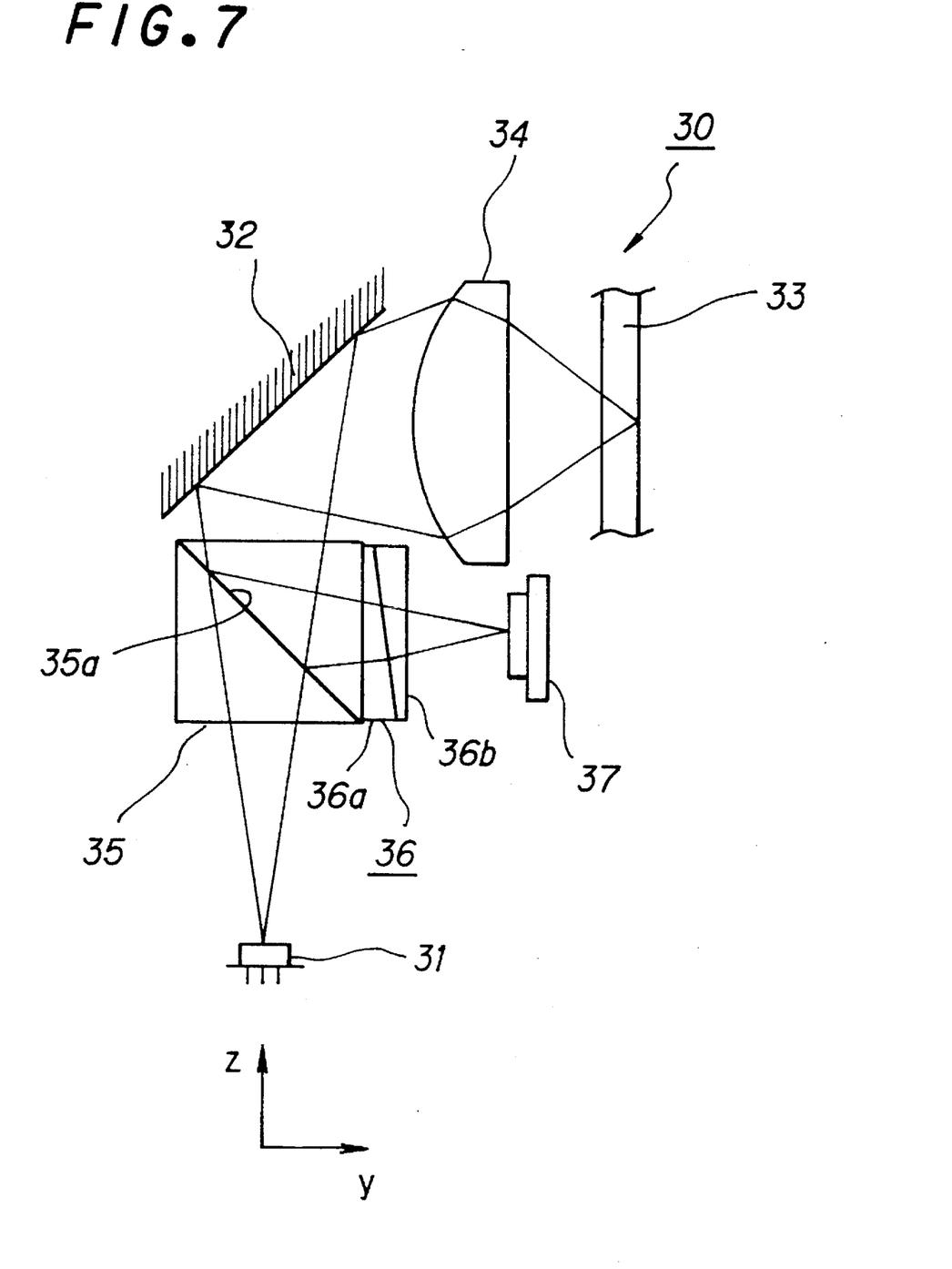
FIG. 7 shows the arrangement of a magneto-optical head apparatus according to a third embodiment of the present invention.

As shown in FIG. 7, a magneto-optical head apparatus 30 according to the third embodiment has a semiconductor laser 31, a beam splitter 35, a totally reflecting mirror 32, an objective lens 34, a Wollaston prism 36, and a photodetector 37.

The semiconductor laser 31 as a light source outputs a light beam on the basis of a drive signal from a driver circuit (not shown) such that, when an information signal is to be recorded onto a magneto-optical disc 33, the semiconductor laser 31 radiates a light beam of high output level, whereas, when an information signal is to be read out from the magneto-optical disc 33, the semiconductor laser 31 radiates a light beam of low output level.

The totally reflecting mirror 32 deflects the optical path of the light beam emitted from the semiconductor laser 31 and transmitted by the beam splitter 35 at 90°. The reflecting mirror 32 is disposed below the objective lens 34 and on the optical axis of the objective lens 34 at a tilt angle of 45° with respect to the optical axis of the light beam emitted from the semiconductor laser 31.

The objective lens 34 converges the light beam reflected by the totally reflecting mirror 32 on the recording surface of the magneto-optical disc 33. The objective lens 34 is an aspherical lens made of glass or a material transparent to a light beam. The objective lens 34 is moved in a direction parallel to the optical axis of the objective lens 34, i.e., in the focusing direction, and also in the direction of plane perpendicular to the optical axis of the objective lens 34, i.e., in the tracking direction, by an actuator (not shown) provided in the magneto-optical head apparatus 30. The objective lens 34 is moved in the focusing and tracking directions by the actuator so as to cancel focusing and tracking errors when an information signal is to be recorded onto the magneto-optical disc 33 or an information signal recorded on the magneto-optical disc 33 is to be reproduced.

The beam splitter 35 is formed in a hexahedral configuration by cementing together two triangular-shaped optical prisms with a dielectric multilayer layer 35a interposed therebetween. The beam splitter 35 separates the light beam emitted from the semiconductor laser 31 and a light beam led into the magneto-optical head apparatus 30 through the objective lens 34 from each other by the dielectric multilayer layer 35a. Further, the beam splitter 35 deflects the optical path of the light beam passing through the objective lens 34 at 90° by the dielectric multilayer layer 35a so that the incident light beam is outputted toward the photodetector 37. The Wollaston prism 36 is bonded to the output surface of the beam splitter 35 from which the light beam passing through the objective lens 34 is outputted, by using an adhesive or the like.

The Wollaston prism 36 is bonded together two optical prisms 36a and 36b. The optical prisms 36a and 36b are each made of an optical material having optical anisotropy, e.g., lithium niobate ($LiNbO_3$). The optical prism 36a on which the light beam outputting from the beam splitter 35 is incident is disposed with its crystal optical axis rotated through 45° with respect to the plane of P-polarization of the light beam, while the optical prism 36b from which the light beam is outputted to the photodetector 37 is disposed with its crystal optical axis rotated through 90° with respect to the plane of P-polarization of the light beam. Under these conditions, the optical prisms 36a and 36b are bonded together. The Wollaston prism 36 generates three light beams, i.e., P-, S- and (P+S)-polarized light components, according to the light beam outputting from the beam splitter 35.

The photodetector 37 has a plurality of light receiving portions. The light receiving portions receive the three light beams, respectively, generated by the Wollaston prism 36. By executing arithmetic processing using output signals from the light receiving portions, a reproduced signal of the information signal recorded on the magneto-optical disc 33 is generated, together with error signals, e.g., a focusing error signal, a tracking error signal, etc., and address and other signals previously recorded on the magneto-optical disc 33.

Although not shown in FIG. 7, a diffraction grating is provided in the optical path between the semiconductor laser 31 and the beam splitter 35 so as to lie on the optical axis of the light beam emitted from the semiconductor laser 31. The diffraction grating converted the light beam emitted from the semiconductor laser 31 into at least three light beams, i.e., a zeroth-order diffracted light beam and ±1st- order diffracted light beams. The ±1st-order diffracted light beams are used to detect a tracking error. The zeroth-order diffracted light beam is used to detect a focusing error and to generate the information signal recorded on the magneto-optical disc 33. However, in FIG. 7, only one light beam is shown for the purpose of simplification.

In the magneto-optical head apparatus 30, arranged as described above, the light beam emitted from the semiconductor laser 31 is led to the totally reflecting mirror 32 through the beam splitter 35. The optical path of the light beam is deflected at 90° by the totally reflecting mirror 32, and thus the reflected light beam is converged on the recording surface of the magneto-optical disc 33 by the objective lens 34. The light beam irradiated to the magneto-optical disc 33 is reflected by the recording surface of the magneto-optical disc 33 and leads into the magneto-optical head apparatus 30 through the objective lens 34. The light beam passing through the objective lens 34, that is, the reflected light beam, irradiates the beam splitter 35 where the optical path of the reflected light beam is deflected at 90° by the dielectric multilayer layer 35a. Thus, the reflected light beam is converged on each light receiving portion of the photodetector 37 through the Wollaston prism 36. The Wollaston prism 36 generates three light beams from the reflected light beam incident thereon and directs them at the photodetector 37. By executing arithmetic processing using output signals from the light receiving portions of the photodetector 37, error signals, e.g., a focusing error signal, a tracking error signal, etc., are generated, together with address and other signals recorded on the magneto-optical disc 33. By determining a difference between output signals from the light receiving portions of the photodetector 37, a reproduced signal of the information signal recorded on the magneto-optical disc 33 is obtained.

As shown in FIG. 7, in the magneto-optical head apparatus 30 according to the third embodiment, the semiconductor laser 31, the beam splitter 35, the reflecting mirror 32 and the photodetector 37 are all disposed in a plane perpendicular to the recording surface of the magneto-optical disc 33, i.e., the ZY-plane, in FIG. 7. In other words, the above-described constituent elements are disposed in a single plate containing the optical axis extending from the semiconductor laser 31 to the totally reflecting mirror 32 through the beam splitter 35, the optical axis extending from the totally reflecting mirror 32 to the objective lens 34, and the optical axis extending from the beam splitter 35 to the photodetector 37. Consequently, the magneto-optical head apparatus 30 according to the third embodiment makes it possible to reduce the width in a plane parallel to the recording surface of the magneto-optical disc 33, which is perpendicular to the ZY-plane in FIG. 7, and hence provides advantageous effects similar to those of the first embodiment.

Figure 8:
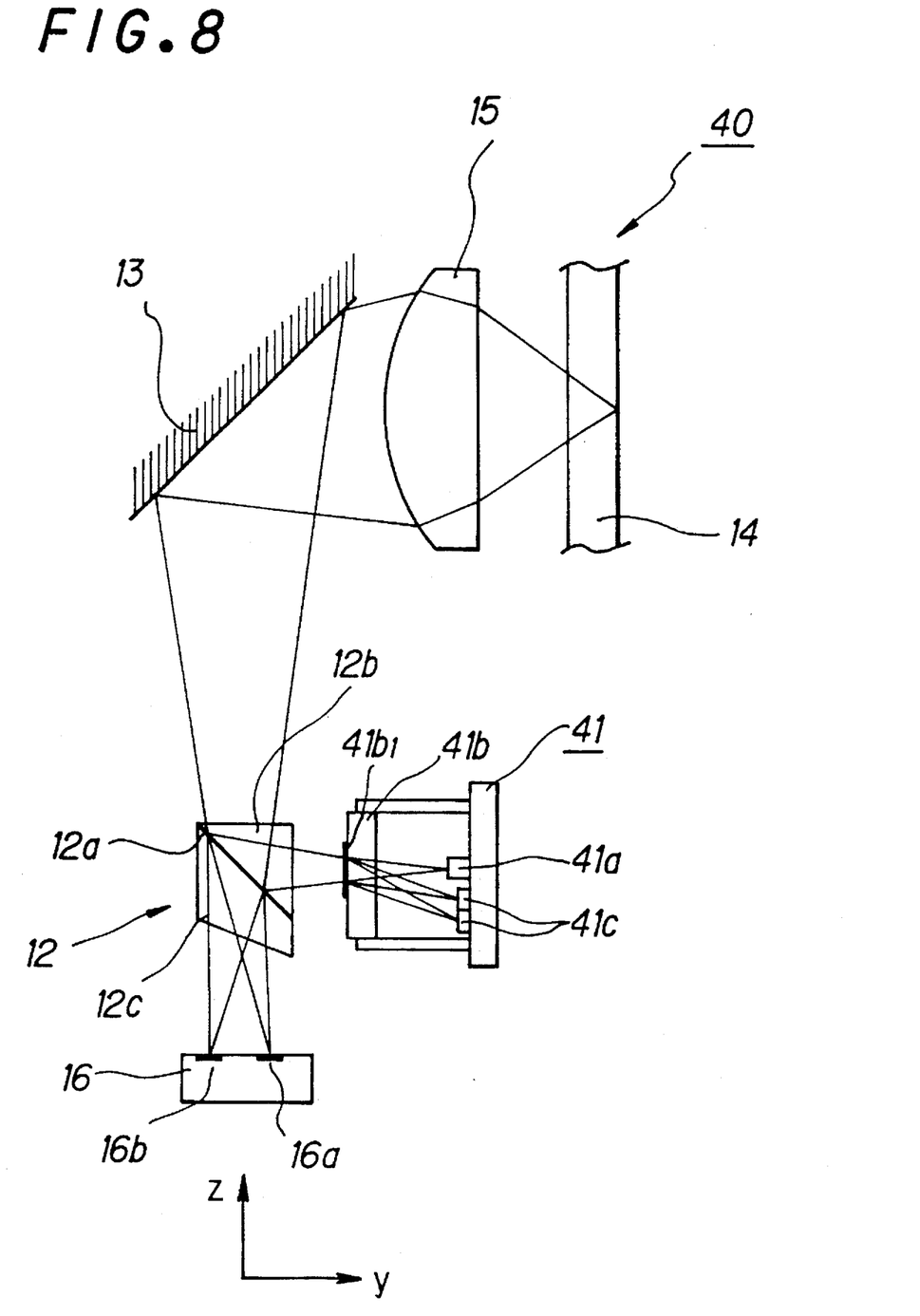
FIG. 8 shows the arrangement of a magneto-optical head apparatus according to a fourth embodiment of the present invention.

Next, a magneto-optical head apparatus according to a fourth embodiment of the present invention will be explained in detail with reference to FIG. 8. It should be noted that in FIG. 8 members or portions which are common to the first and fourth embodiments are denoted by the same reference numerals as those in the first embodiment, and repeated description thereof is omitted. Referring to FIG. 8, a magneto-optical head apparatus 40 has a light beam generating and detecting unit 41. The light beam generating and detecting unit 41 has a semiconductor laser 41a, a hologram element 41b, and a photodetector 41c. The semiconductor laser 41a outputs a light beam on the basis of a drive signal from a driver circuit (not shown) such that, when an information signal is to be recorded onto the magneto-optical disc 14, the semiconductor laser 41a radiates a light beam of high output level, whereas, when an information signal is to be read out from the magneto-optical disc 14, the semiconductor laser 41a radiates a light beam of low output level. The semiconductor laser 41a, together with the photodetector 41c, is provided on a common base, and accommodated in a single package.

The hologram element 41b is rigidly secured to the top surface of the package by an adhesive or the like. The hologram element 41b is composed of a glass substrate which has a hologram $41b_1$ formed on the outer surface thereof and which has a diffraction grating formed on the reverse side thereof. The diffraction grating formed on the reverse side of the hologram element 41b generate a plurality of light beams, e.g., ±1st-order diffracted light beams, from a light beam emitted from the semiconductor laser 41a for generating a tracking error signal. The hologram $41b_1$, which is formed on the outer surface of the hologram element 41b, has two regions different in grating period from each other. As will be described later, a light beam passing through the objective lens 15 leads into the light beam receiving and detecting unit 41, in which a part of the light beam that passes through one of the two regions of the hologram $41b_1$, which have different grating periods, is converged on one of the light receiving portions of the photodetector 41c (described later), while another part of the light beam that passes through the other region of the hologram $41b_1$ is converged on another light receiving portion of the photodetector 41c. The hologram $41b_1$ is formed by using the technique of computer generated hologram. For example, the hologram $41b_1$ is manufactured by the following method: Hologram data generated by a computer is transferred to a photoresist on a glass substrate by an electron-beam exposure system. With the photoresist used as a mask, a hologram is formed on the glass substrate by employing the oblique incidence ion beam etching method.

The photodetector 41c has a plurality light receiving portions. By executing arithmetic processing using output signals from the light receiving portions, error signals, e.g., a focusing error signal, a tracking error signal, etc., are generated.

In the magneto-optical head apparatus 40 according to the fourth embodiment, arranged as described above, the light beam emitted from the semiconductor laser 41a is passed through the hologram element 41b and then irradiates the beam splitter 12 where the optical path of the light beam is deflected at 90° by the dielectric multilayer layer 12a. When passing through the hologram element 41b, the light beam is divided into at least three light beams, i.e., a zeroth-order diffracted light beam, and ±1st-order diffracted light beams. In FIG. 8, however, only one light beam is shown for the purpose of simplification. The light beam deflected by the dielectric multilayer layer 12a of the beam splitter 12 is irradiated to the totally reflecting mirror 13 where the optical path of the light beam is deflected at 90° again. The light beam deflected at 90° by the totally reflecting mirror 13 is converged on the recording surface of the magneto-optical disc 14 by the objective lens 15. The light beam irradiated to the magneto-optical disc 14 is reflected by the recording surface of the magneto-optical disc 14 and leads into the magneto-optical head apparatus 40 through the objective lens 15. The light beam passing through the objective lens 15, that is, the reflected light beam, irradiates the beam splitter 12 where the optical path of a part of the reflected light beam is deflected at 90° so that the deflected light beam is led to the light beam generating and detecting unit 41, while the remaining reflected light beam passes through the beam splitter 12. When the remaining reflected light beam passes through the optical prism 12c, two light beams, that is, ordinary and extraordinary rays, are generated. The two light beams generated by the beam splitter 12 are received by the light receiving portions 16a and 16b, respectively, of the photodetector 16. Meanwhile, the reflected light beam deflected toward the light beam generating and detecting unit 41 is incident on the hologram element 41b. A part of the light beam that passes through one of the two regions of the hologram $41b_1$, which have different grating periods, is received by one light receiving portion of the photodetector 41c, while another part of the light beam that passes through the other region of the hologram $41b_1$ is received by the other light receiving portion. Consequently, by executing arithmetic processing using output signals from the light receiving portions of the photodetector 41c, error signals, e.g., a focusing error signal, a tracking error signal, etc., are generated, together with address and other signals recorded on the magneto-optical disc 14. By determining a difference between output signals from the light receiving portions 16a and 16b of the photodetector 16, a reproduced signal of the information signal recorded on the magneto-optical disc 14 can be obtained.

As shown in FIG. 8, in the magneto-optical head apparatus 40 according to the fourth embodiment, the light beam generating and detecting unit 41, the beam splitter 12, the reflecting mirror 13 and the photodetector 16 are all disposed in a plane perpendicular to the recording surface of the magneto-optical disc 14, i.e., ZY- plane, in FIG. 8. In other words, the above-described constituent elements are disposed in a single plane containing the optical axis extending from the totally reflecting mirror 13 to the photodetector 16 via the beam splitter 12, the optical axis extending from the light beam generating and detecting unit 41 to the beam splitter 12, and the optical axis extending from the totally reflecting mirror 13 to the objective lens 15. Consequently, the magneto-optical head apparatus 40 according to the fourth embodiment makes it possible to reduce the width in a plane parallel to the recording surface of the magneto-optical disc 14, which is perpendicular to the ZY-plane in FIG. 8, and hence provides advantageous effects similar to those of the first embodiment.

According to the present invention, it is possible to provide a compact-size magneto-optical head apparatus which is free from the problem that, when fed toward the inner periphery of the magneto-optical disc, the magneto-optical head apparatus may collide with the spindle motor that rotates the magneto-optical disc, as shown in the foregoing embodiments.

Further, if one of the two optical prisms constituting a beam splitter is formed from an optical material having optical anisotropy, as shown in the first and second embodiments, it becomes unnecessary to provide a Wollaston prism as used in the optical head apparatus shown in FIG. 1. Therefore, it is possible not only to reduce the number of parts required but also to shorten the optical path length from the beam splitter to the photodetector. Accordingly, the magneto-optical head apparatus can be formed in an even more compact structure.

Further, if a photodetector for reproducing an information signal recorded on a magneto-optical head disc and a photodetector for detecting error signals are provided separately from each other as in the first, second and fourth embodiments, it is possible to obtain a signal of high CNR (Carrier to Noise Ratio) from the photodetector for the information signal. In this case, since the above-described arrangement is adopted, it is possible to avoid an increase in the overall size of the magneto-optical head apparatus.

Although in the foregoing embodiments the present invention has been described by way of one example in which the invention is applied to a magneto-optical head apparatus for recording or reproducing an information signal onto or from a magneto-optical recording medium, it should be noted that the present invention may also be applied to an optical head apparatus which is compatible with both a magneto-optical disc and a read-only type optical disc.

It should also be noted that various changes and modifications may be imparted to the described embodiments without departing from the spirit and scope of the present invention, as a matter of course.

What is claimed is:

1. A magneto-optical head apparatus comprising:

light beam generating means for emitting a light beam;

an objective lens for converging the light beam emitted from said light beam generating means on a point on an optical axis;

a separating optical element for separating the light beam emitted from said light beam generating means and a light beam through said objective lens from each other;

a reflecting mirror for deflecting the light beam emitted from said light beam generating means at 90 degrees so that the light beam is led to said objective lens; and a photodetector for receiving the light beam through said objective lens and separated by said separating optical element, wherein said light beam generating means, said objective lens, said separating optical element, said reflecting mirror, and said photodetector are disposed so that an optical axis of the light beam emitted from said light beam generating means, an optical axis extending from said separating optical element to said reflecting mirror, an optical axis extending from said reflecting mirror to said objective lens, and an optical axis extending from said separating optical element to said photodetector define the same plane, and wherein said light beam generating means comprises a light source for emitting a light beam, a light receiving portion for receiving the light beam through said objective lens and separated by said separating optical element, and a further separating optical element for separating the light beam emitted from said light source and the light beam through said objective lens from each other and for leading the light beam through said objective lens to said light receiving portion.

2. A magneto-optical head apparatus according to claim 1, wherein said photodetector is arranged on the optical axis of the light beam emitted from said light beam generating means and deflected by said separating optical element.

3. A magneto-optical head apparatus according to claim 1, wherein said separating optical element comprises a first prism made of glass and disposed at a side from which the light beam emitted from said light beam generating means is outputted, and a second prism formed from an optical material having optical anisotropy and is arranged at a side from which the light beam through said objective lens is outputted.

4. A magneto-optical head apparatus comprising:

light beam generating means for emitting a light beam;

an objective lens for converging the light beam emitted from said light beam generating means on a point on an optical axis;

a separating optical element for deflecting the light beam emitted from said light beam generating means and for separating the light beam emitted from said light beam generating means and a light beam outputting through said objective lens from each other;

a reflecting mirror for deflecting the light beam emitted from said light beam generating means and deflected by said separating optical element at 90 degrees so that said light beam is led to said objective lens; and a photodetector for receiving the light beam through said objective lens and passing through said separating optical element, wherein said light beam generating means, said objective lens, said separating optical element, said reflecting mirror, and said photodetector are disposed so that an optical axis of the light beam emitted from said light beam generating means, an optical axis extending from said separating optical element to said reflecting mirror, an optical axis extending from said reflecting mirror to said objective lens, and an optical axis extending from said separating optical element to said photodetector define the same plane, and wherein said light beam generating means comprises a light source for emitting a light beam, a light receiving portion for receiving the light beam through said objective lens and separated by said separating optical element, and a further separating optical element for separating the light beam emitted from said light source and the light beam through said objective lens from each other and for leading the light beam through said objective lens to said light receiving portion.

5. A magneto-optical head apparatus according to claim 4, wherein said photodetector is disposed on the optical axis of the light beam emitted from said light beam generating means and deflected by said separating optical element.

6. A magneto-optical head apparatus according to claim 4, wherein said separating optical element comprises a first prism made of glass and disposed at a side from which the light beam emitted from said light beam generating means is outputted, and a second prism made of an optical material having optical anisotropy and is arranged at a side from which the light beam through said objective lens is outputted.

7. A magneto-optical head apparatus comprising:

light beam generating means having a light source for emitting a light beam, and a first photodetector for detecting error;

an objective lens for converging the light beam emitted from said light beam generating means on a point on an optical axis;

a separating optical element for separating the light beam emitted from said light beam generating means and a light beam through said objective lens from each other;

a reflecting mirror for deflecting the light beam emitted from said light beam generating means at 90° so that the light beam is led to said objective lens; and a second photodetector for receiving the light beam through said objective lens and for detecting a reproduced signal, wherein the light beam through said objective lens is split by said separating optical element into a light beam that is led to said first photodetector, and another light beam that is led to said second photodetector, and wherein said light beam generating means, said objective lens, said separating optical element and said second photodetector are disposed so that an optical axis of the light beam emitted from said light beam generating means, an optical axis extending from said separating optical element to said reflecting mirror, an optical axis extending from said reflecting mirror to said objective lens, and an optical axis extending from said separating optical element to said second photodetector define the same plane.

8. A magneto-optical head apparatus according to claim 7, wherein said light beam generating means comprises a further separating optical element for separating the light beam emitted from said light source and the light beam separated by said separating optical element from each other.

9. A magneto-optical head apparatus comprising:

light beam generating means for emitting a light beam;

an objective lens for converging the light beam emitted from said light beam generating means on a point on an optical axis;

a separating optical element for separating the light beam emitted from said light beam generating means and a light beam through said objective lens from each other;

a reflecting mirror for deflecting the light beam emitted from said light beam generating means at 90 degrees so that the light beam is led to said objective lens; and a photodetector for receiving the light beam through said objective lens and separated by said separating optical element, wherein said light beam generating means, said objective lens, said separating optical element, said reflecting mirror, and said photodetector are disposed so that an optical axis of the light beam emitted from said light beam generating means, an optical axis extending from said separating optical element to said reflecting mirror, an optical axis extending from said reflecting mirror to said objective lens, and an optical axis extending from said separating optical element to said photodetector define the same plane, and wherein said separating optical element comprises a first prism made of glass and arranged at a side from which the light beam emitted from said light beam generating means is outputted, a second prism formed from an optical material having optical anisotropy and is arranged at a side from which the light beam through said objective lens is outputted, and said second prism has an output surface inclined at a predetermined angle with respect to an output surface of said first prism from which the light beam emitted from said light beam generating means outputs, and a dielectric multilayer layer provided between said first and second prisms, said first and second prisms are joined together with said dielectric multilayer layer interposed therebetween.

10. A magneto-optical head apparatus comprising:

light beam generating means for emitting a light beam;

an objective lens for converging the light beam emitted from said light beam generating means on a point on an optical axis;

a separating optical element for deflecting the light beam emitted from said light beam generating means and for separating the light beam emitted from said light beam generating means and a light beam outputting through said objective lens from each other;

a reflecting mirror for deflecting the light beam emitted from said light beam generating means and deflected by said separating optical element at 90 degrees so that said light beam is led to said objective lens; and a photodetector for receiving the light beam through said objective lens and passing through said separating optical element, wherein said light beam generating means, said objective lens, said separating optical element, said reflecting mirror, and said photodetector are disposed so that an optical axis of the light beam emitted from said light beam generating means, an optical axis extending from said separating optical element to said reflecting mirror, an optical axis extending from said reflecting mirror to said objective lens, and an optical axis extending from said separating optical element to said photodetector define the same plane, and wherein said separating optical element comprises a first prism made of glass and is disposed at a side from which the light beam emitted from said light beam generating means is outputted, a second prism made of an optical material having optical anisotropy and arranged at a side from which the light beam through said objective lens is outputted, said second prism has an output surf ace inclined at a predetermined angle with respect to an output surface of said first prism from which the light beam emitted from said light beam generating means outputs, and a dielectric multilayer layer provided between said first and second prisms, said first and second prisms being cemented together with said dielectric multilayer layer interposed therebetween.

* * * * *